United States Patent
Huang (10) Patent No.: US 7,600,706 B2
(45) Date of Patent: Oct. 13, 2009

(54) SAFETY FOOD GRINDER

(76) Inventor: Yuming Huang, 2 Fl., No. 191, Sinsiao Rd., Tainan City (TW)

( * ) Notice: Subject to any disclaimer, the term of this patent is extended or adjusted under 35 U.S.C. 154(b) by 64 days.

(21) Appl. No.: 12/010,376

(22) Filed: Jan. 24, 2008

(65) Prior Publication Data

US 2009/0189001 A1 Jul. 30, 2009

(51) Int. Cl.
*A01F 21/00* (2006.01)
*B02C 17/02* (2006.01)

(52) U.S. Cl. ................. 241/37.5; 241/92; 241/282.2
(58) Field of Classification Search ............. 241/37.5, 241/92, 278.1, 282.1, 282.2; 99/510, 492; 366/199, 205
See application file for complete search history.

(56) References Cited

U.S. PATENT DOCUMENTS

| | | | | |
|---|---|---|---|---|
| 4,087,053 A | * | 5/1978 | Voglesonger | 241/282.1 |
| 6,000,650 A | * | 12/1999 | Penaranda et al. | 241/282.1 |
| 6,910,800 B2 | * | 6/2005 | Wu | 366/199 |
| 7,387,269 B2 | * | 6/2008 | Mally | 241/282.1 |

\* cited by examiner

*Primary Examiner*—Faye Francis
(74) *Attorney, Agent, or Firm*—Muncy, Geissler, Olds & Lowe, PLLC (57) ABSTRACT

A safety food grinder is applied to grind food and has a base, a container assembly, multiple movable stops and a cover. The base has a driver. The container assembly is mounted detachably on the base and has a cutting tool and multiple sliding channels. The cutting tool is connected detachably to and is selectively driven by the driver. The movable stops are respectively mounted slidably in the sliding channels and selectively keep the cutting tool from being driven by the driver. The cover is detachably mounted around the container assembly and selectively moves the movable stops to allow the cutting tool to be driven by the driver. Consequently, the cutting tool is only driven when the cover is mounted on the container assembly and the base so prevents users from being cut accidentally even when the safety food grinder is turned on unexpectedly.

12 Claims, 7 Drawing Sheets

SAFETY FOOD GRINDER

BACKGROUND OF THE INVENTION

1. Field of the Invention

The present invention relates to a safety food grinder, and more particularly to a food grinder, which ensures safety of users when operating it to grind food.

2. Description of the Prior Arts

A conventional food grinder is used to grind food and has a base, a container and a cutting tool. The base includes a motor. The container is attached to the base to be put with food that needs to be ground. The cutting tool is attached to the motor of the base, extends into the container and is driven by the motor to grind the food.

However, the conventional food grinder usually does not have enough protecting device for safety of operating so users may get hurt when operating the conventional food grinder. Accidents may occur due to carelessness while operating, for example, the user turns on the conventional food grinder unwittingly and then get hands cut.

To overcome the shortcomings, the present invention provides a safety food grinder to mitigate or obviate the aforementioned problems.

SUMMARY OF THE INVENTION

The primary objective of the present invention is to provide a food grinder, which ensures safety of operating.

The safety food grinder is applied to grind food and has a base, a container assembly, multiple movable stops and a cover. The base has a driver. The container assembly is mounted detachably on the base and has a cutting tool and multiple sliding channels. The cutting tool is connected detachably to and is selectively driven by the driver. The movable stops are respectively mounted slidably in the sliding channels and selectively keep the cutting tool from being driven by the driver. The cover is detachably mounted around the container assembly and selectively moves the movable stops to allow the cutting tool to be driven by the driver. Consequently, the cutting tool is only driven when the cover is mounted on the container assembly and the base so prevents users from being cut accidentally even when the safety food grinder is turned on unexpectedly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
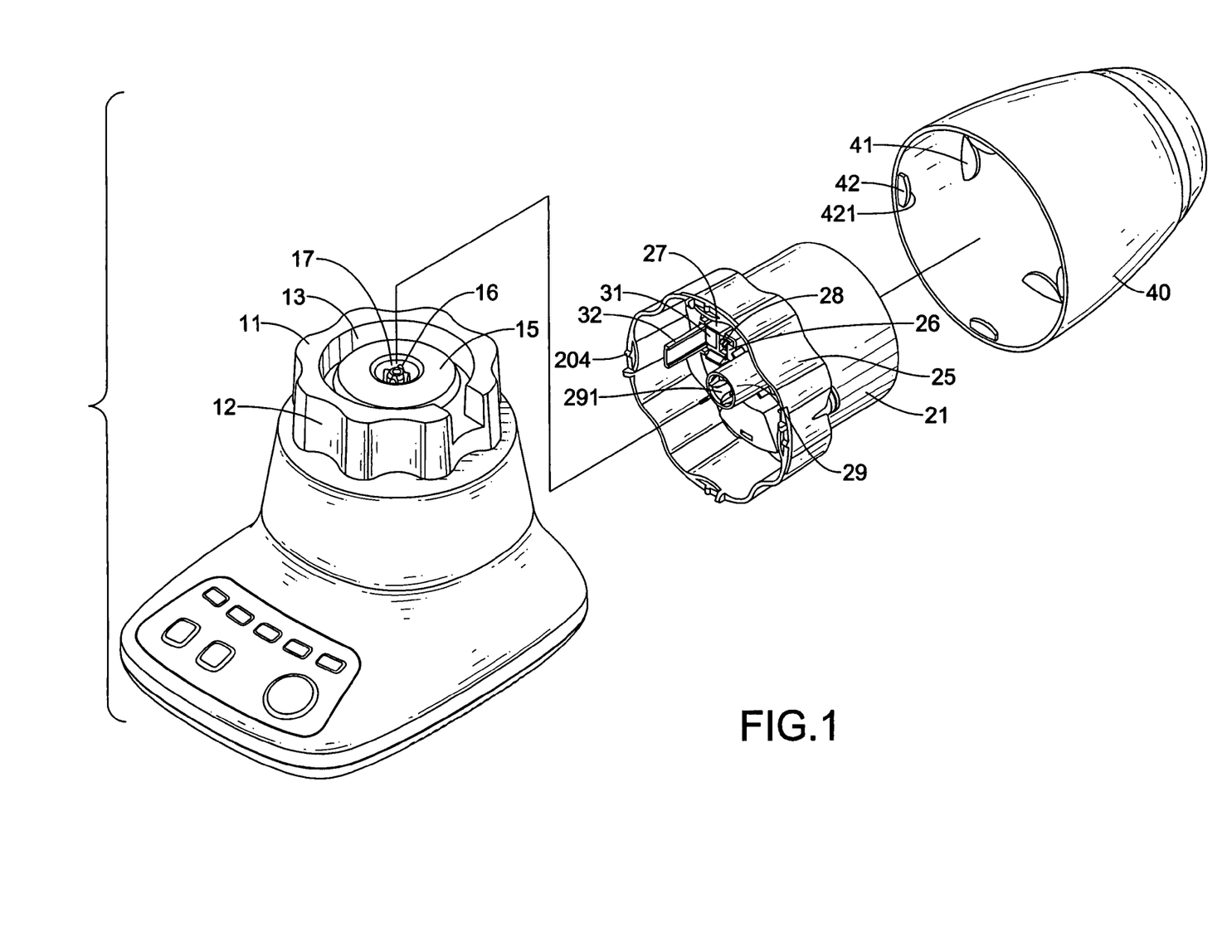
FIG. 1 is an exploded perspective view of a safety food grinder in accordance with the present invention.
Figure 2:
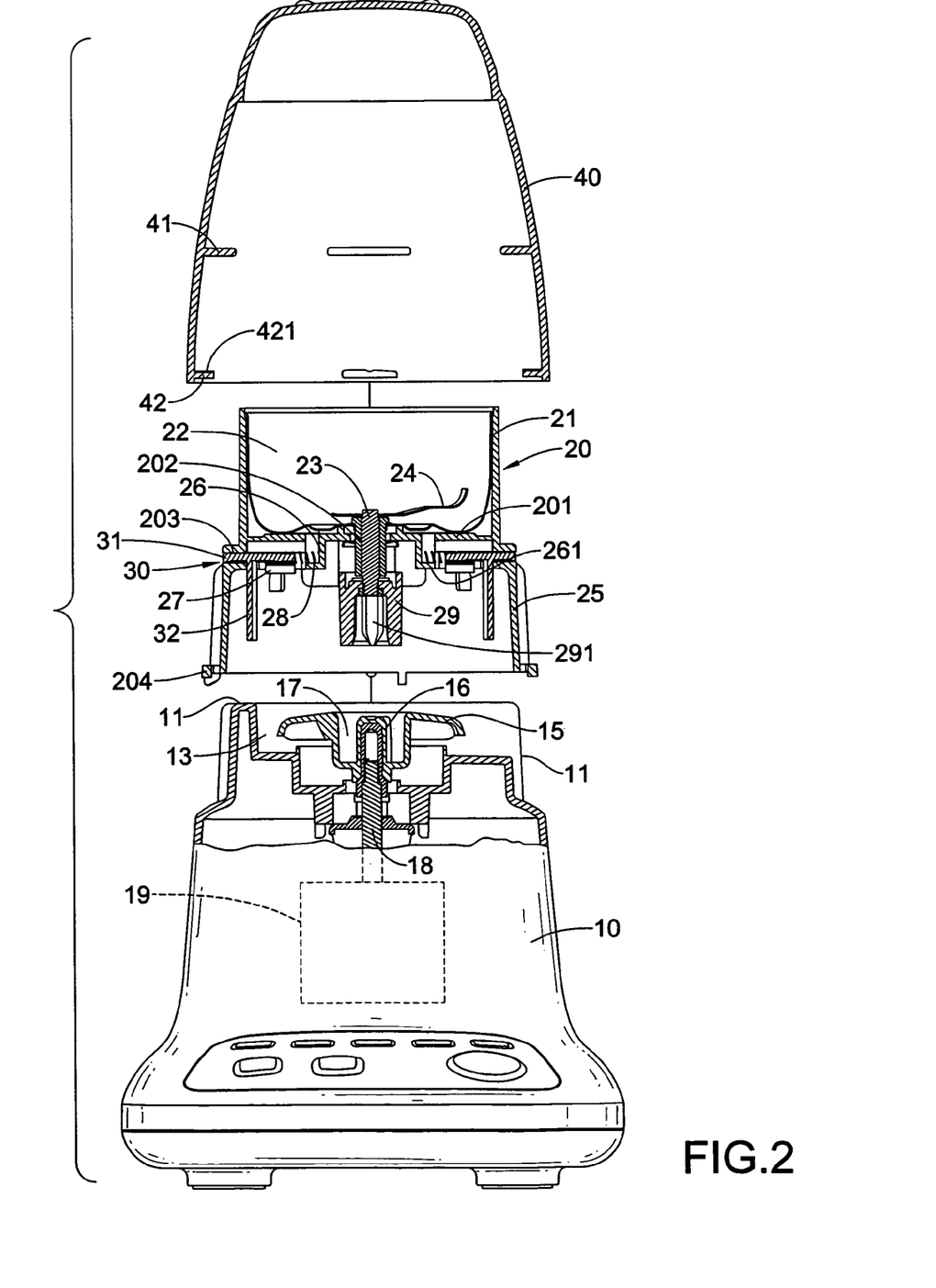
FIG. 2 is an exploded front view in partial section of the safety food grinder in FIG. 1.

With reference to FIGS. 1 and 2, a safety food grinder in accordance with the present invention comprises a base (10), a container assembly (20), two movable stops (30) and a cover (40).

The base (10) has a top, a motor (19), a container mount (11) and a driver (15).

The motor (19) is mounted inside the base (10).

The container mount (11) is formed on and protrudes from the top of the base (10) and has a top, a cavity (13) and an outer surface (12). The cavity (13) is formed concentrically in the top of the container mount (11). The outer surface (12) of the container mount (11) may be keyed.

The driver (15) is mounted rotatably in the top of the base (10), protrudes out of the top of the base (10) into the cavity (13) of the container mount (11), is attached to and is driven by the motor (19) and has a top, a bottom, a driving shaft (18), an optional connecting recess (17) and an optional engaging head (16). The driving shaft (18) is mounted on the bottom of the driver (15) and connects to the motor (19) such that allows the driver (15) to co-rotate with the motor (19). The connecting recess (17) is formed concentrically in the top of the driver (15) and has a bottom. The engaging head (16) is keyed, is formed concentrically in and protrudes from the bottom of the connecting recess (17).

The container assembly (20) is mounted detachably on the base (10) and has a container frame (21), a container body (22), a connecting cylinder (25), a bottom extension (26), two optional clamps (27), a rotating shaft (23) and a cutting tool (24).

The container frame (21) is a cylinder, is detachably mounted on the top of the base (10) and has a top opening and a bottom wall (201). The bottom wall (201) has a center.

The container body (22) is mounted in the container frame (20) on the bottom wall (201).

The connecting cylinder (25) is formed on and protrudes downward from the container frame (21), corresponds to and is detachably mounted around the outer surface (12) of the container mount (11) and has a sidewall, two sliding channels (203) and at least one optional positioning boss (204). The sidewall has a lower edge. The sliding channels (203) are formed transversely through the sidewall of the connecting cylinder (25). The at least one positioning boss (204) is formed on and protrudes from the lower edge of the sidewall of the connecting cylinder (25)

The bottom extension (26) is attached to and protrudes towards the base (10) from the center of the bottom wall (201) and has two spring mounts (261) and may have a shaft sleeve (202). The spring mounts (261) are formed on the bottom extension (26) and respectively correspond to the sliding channels (203). The shaft sleeve (202) is mounted securely coaxially through the bottom wall (201) of the container frame (21) and the bottom extension (26).

Figure 6:
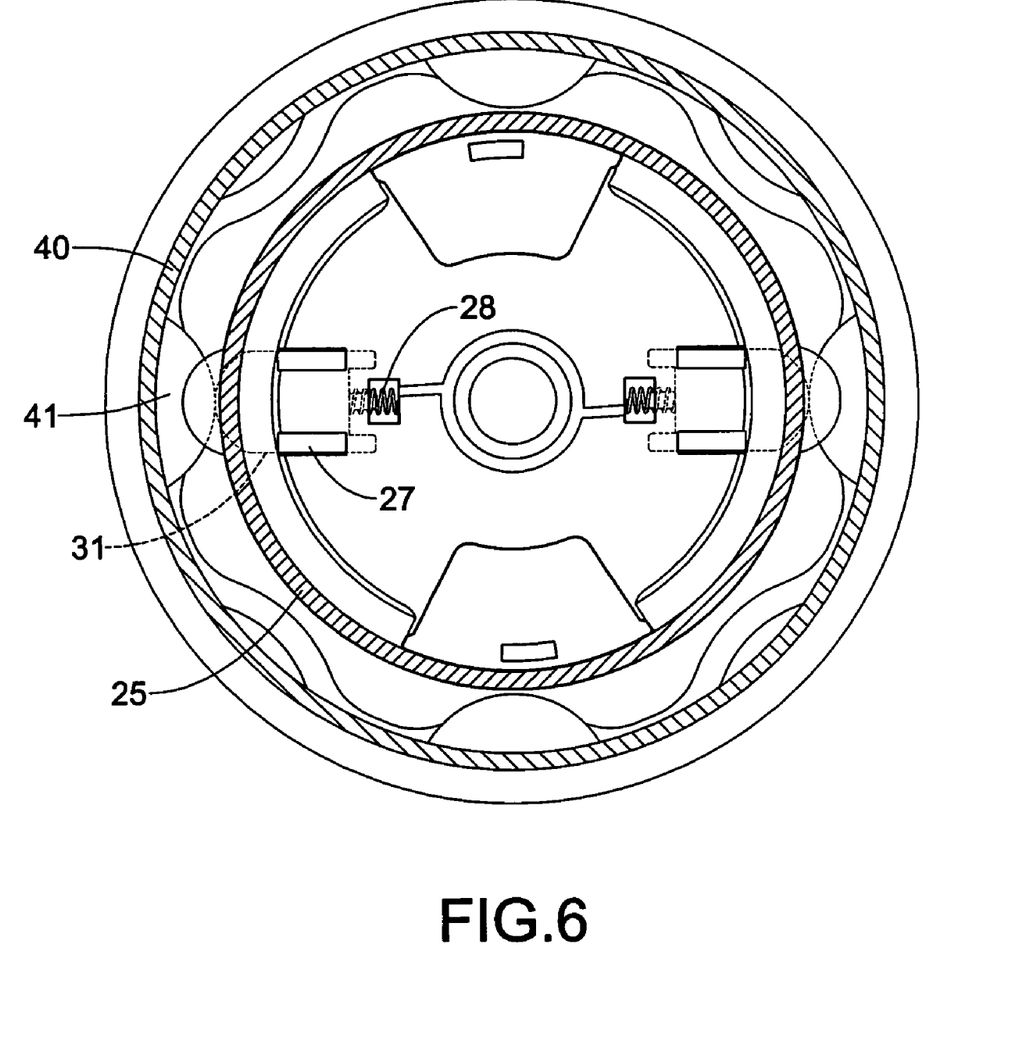
FIG. 6 is a top view in partial section of the safety food grinder in FIG. 1.

With further reference to FIG. 6, the clamps (27) are mounted below the bottom wall (201) of the container frame (21) and are respectively mounted between the spring mounts (261) and the sliding channels (203).

The rotating shaft (23) is mounted rotatably concentrically through the shaft sleeve (202), protrudes into the container body (21), is connected detachably to and is selectively driven by the driver (15) and has an upper end, a lower end and an optional shaft coupling (29). The shaft coupling (29) is attached securely coaxially on the lower end of the rotating shaft (23), is detachably attached to the driver (15) so allows the rotating shaft (23) to be selectively driven by the driver (15) and has a lower end and an engaging recess (291). The engaging recess (291) is formed in the lower end of the shaft coupling (29), corresponds to the engaging head (16) and is detachably mounted around the engaging head (16).

The cutting tool (24) is mounted securely on the upper end of the rotating shaft (23) to grind food.

The movable stops (30) are respectively mounted slidably in the sliding channels (203) of the connecting cylinder (25), selectively keep the rotating shaft (23) from connecting to the driver (15) and each movable stop (30) has a spring (28), a slide (31) and a leg (32).

The spring (28) is mounted in one of the spring mounts (261) and aligns with the corresponding sliding channel (203).

The slide (31) is mounted slidably in the corresponding sliding channel (203), is mounted through and is clamped by the corresponding clamp (27) to limit the slide (31) moving to a single direction, and abuts and is pressed outwards by the spring (28).

The leg (32) is formed on and protrudes towards the base (10) from the slide (31), corresponds to the cavity (13) of the container mount (11) and selectively abuts the top of the container mount (11) to keep the container assembly (20) from being mounted on the base (10).

The cover (40) is detachably mounted around the container assembly (20) and the container mount (11), seals the top opening of the container frame (21), allows the rotating shaft (23) to be driven by the driver (15) and has an inner wall, two pushers (41) and at least one positioning tab (42).

The pushers (41) are formed on the inner wall of the cover (40), correspond to the sliding channels (203) and selectively press the slides (31) of the movable stops (30) inwardly against the springs (28) to move the legs (32) of the movable stops (30) from above the container mount (11) toward above the cavity (13).

Figure 7:
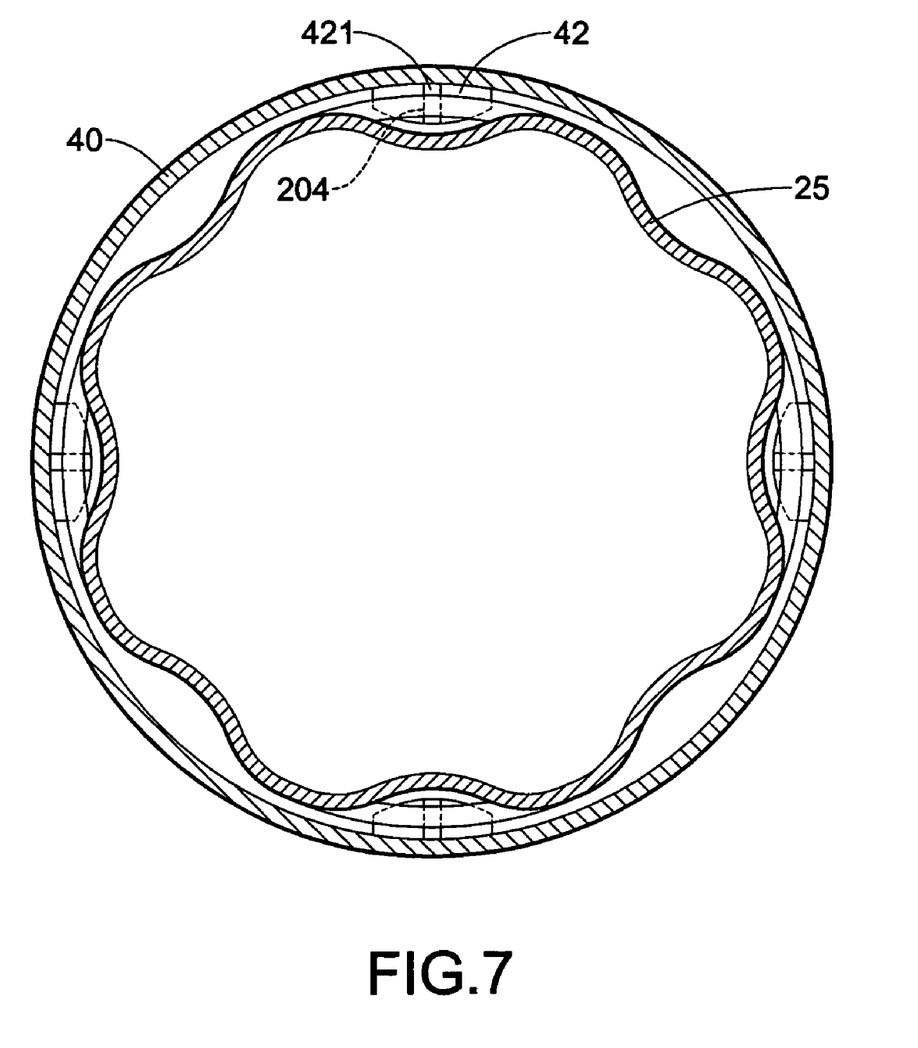
FIG. 7 is a cross-sectional top view of the container assembly of the safety food grinder in FIG. 1.

With further reference to FIG. 7, the at least one positioning tab (42) selectively abuts the corresponding positioning boss (204) to provide rotational friction to hold the cover (40) in position temporarily relative to the container assembly (30). Each positioning tab (42) may have a positioning slot (421). The positioning slot (421) is formed in the positioning tab (42) and selectively engages the corresponding positioning boss (204) such that provides rotational friction.

Figure 3:
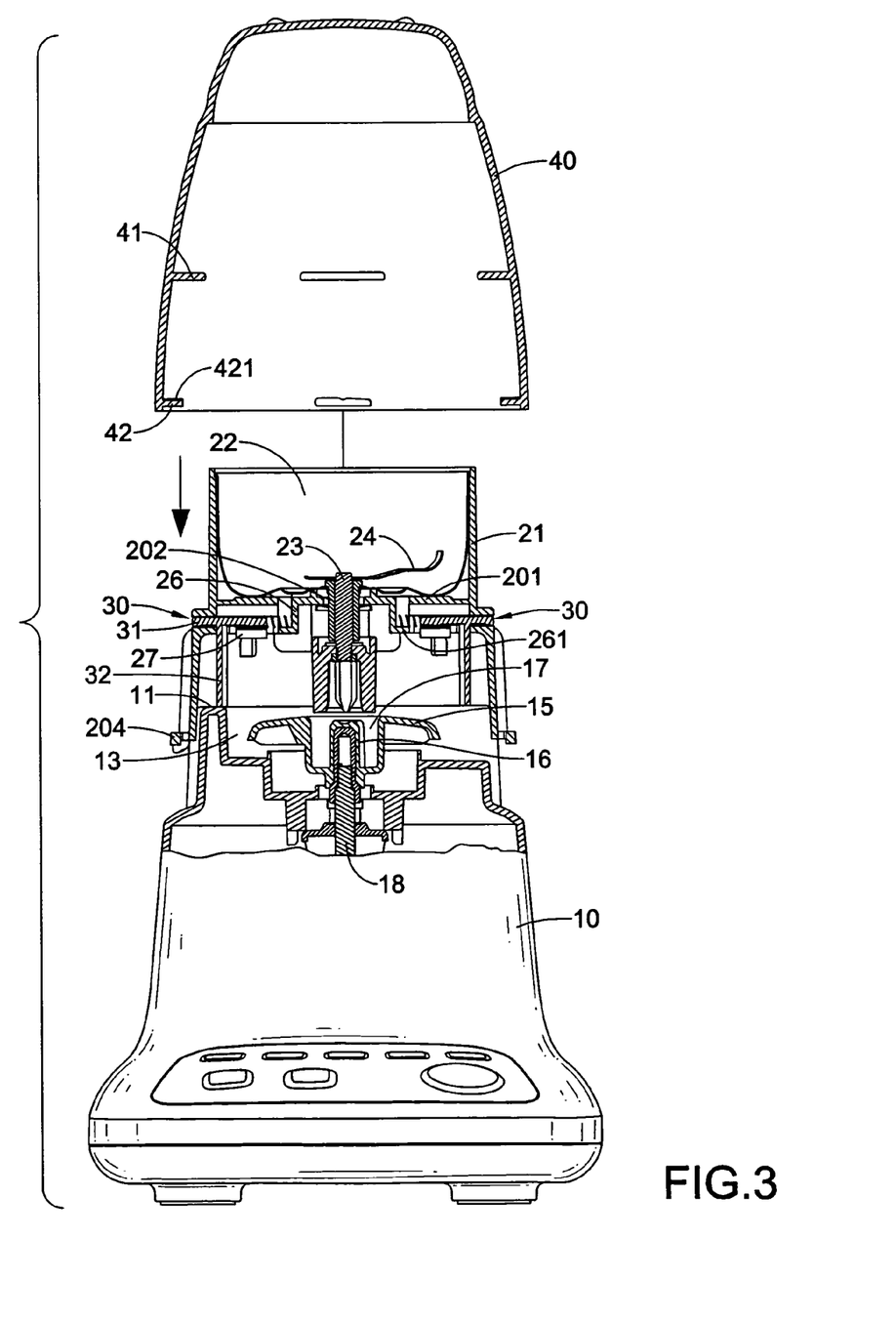
FIGS. 3 to 5 are operational front views in partial section of the safety food grinder in FIG. 1 showing procedures of assembling.
Figure 4:
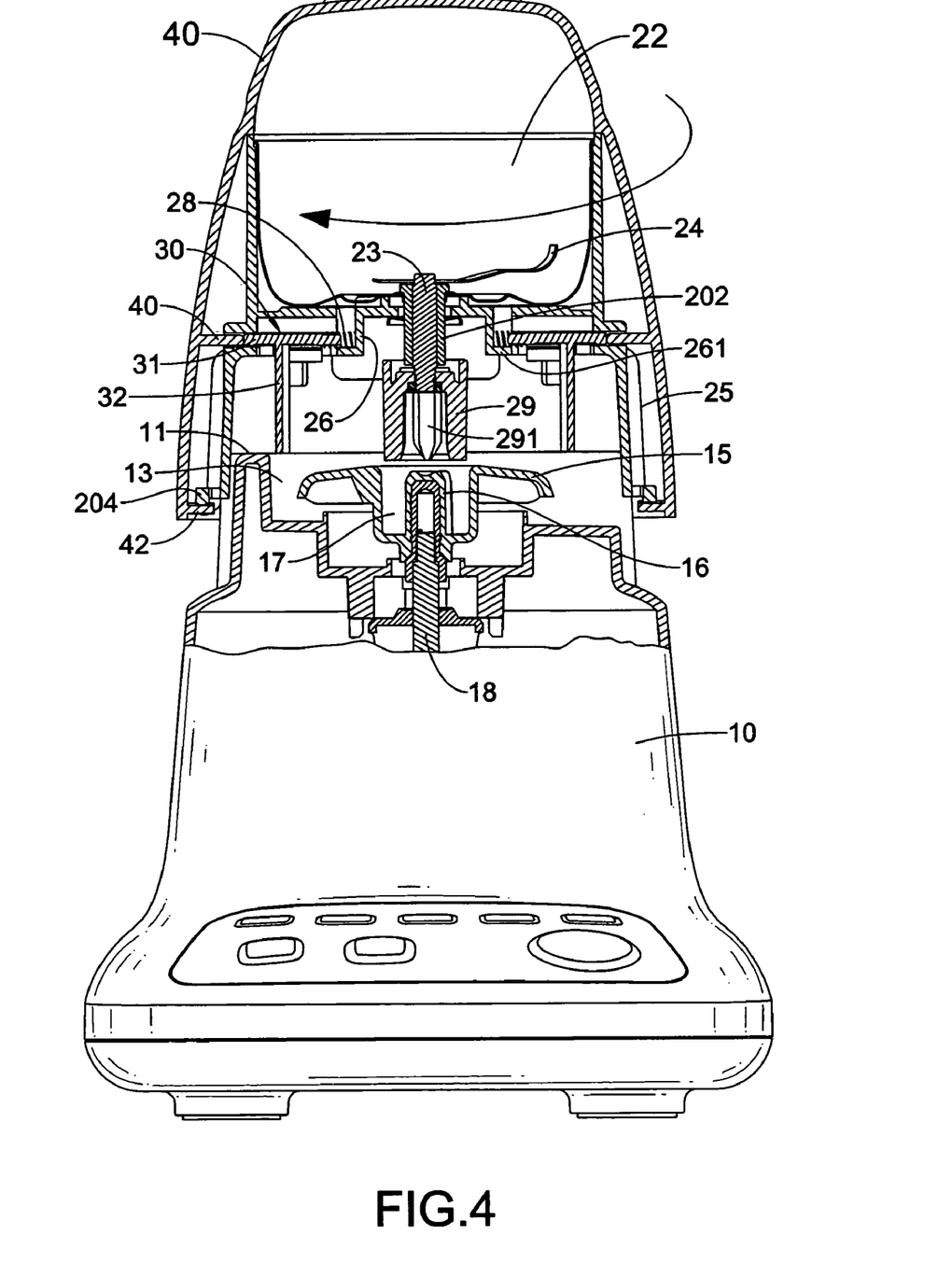
Figure 5:
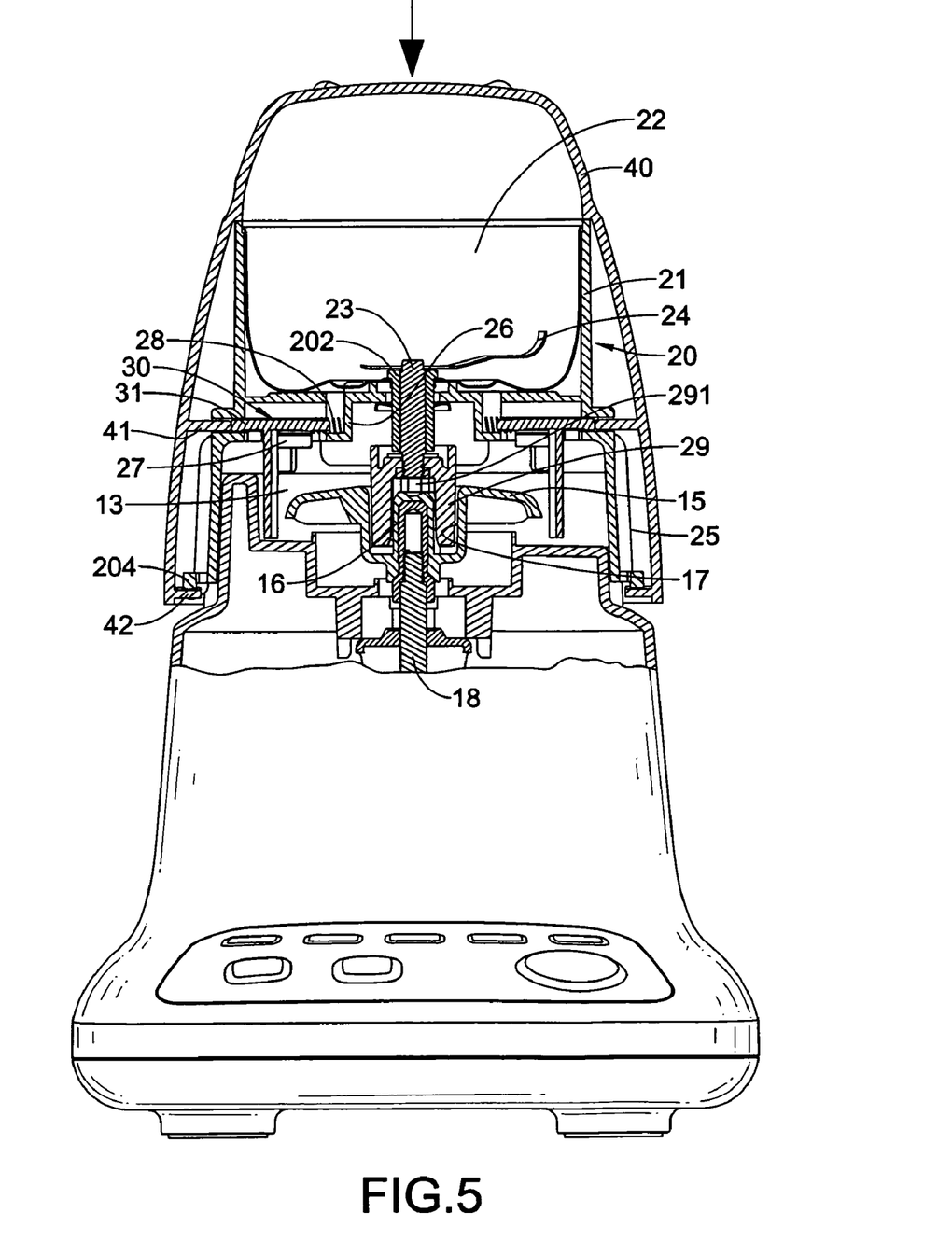

With further reference to FIGS. 3 to 5, when the safety food grinder as described is operated, users need to put the cover (40) over the container assembly (30). Then the cover (40) is rotated relative to the container assembly (30), so the pushers (41) move the movable stops (30) to allow the container assembly (20) to be mounted onto the base (10). Consequently, the cutting tool (24) is only driven when the cover (40) is mounted on the container assembly (20) and the base (10) so prevents users from being cut accidentally even when the safety food grinder as described is turned on unexpectedly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A safety food grinder comprising
a base having
  a top;
  a motor being mounted inside the base;
  a container mount being formed on and protruding from the top of the base and having
    a top,
    a cavity being formed concentrically in the top of the container mount; and
    an outer surface; and
  a driver being mounted rotatably in the top of the base, protruding out of the top of the base into the cavity of the container mount, being attached to and being driven by the motor and having
    a top;
    a bottom; and
    a driving shaft being mounted on the bottom of the driver and connecting to the motor;
a container assembly being mounted detachably on the base and having
  a container frame being a cylinder, being detachably mounted on the top of the base and having
    a top opening; and
    a bottom wall having a center;
  a container body being mounted in the container frame;
  a connecting cylinder being formed on and protruding downward from the container frame, corresponding to and being detachably mounted around the outer surface of the container mount and having
    a sidewall having a lower edge; and
    multiple sliding channels being formed transversely through the sidewall of the connecting cylinder;
  a bottom extension being attached to and protruding towards the base from the center of the bottom wall and having multiple spring mounts being formed on the bottom extension and respectively corresponding to the sliding channels;
  a rotating shaft being mounted rotatably concentrically through the bottom extension, protruding into the container body, being connected detachably to and being selectively driven by the driver and having
    an upper end; and
    a lower end; and
  a cutting tool being mounted securely on the upper end of the rotating shaft;
  multiple movable stops being respectively mounted slidably in the sliding channels of the connecting cylinder, selectively keeping the rotating shaft from connecting to the driver and each movable stop having
    a spring being mounted in one of the spring mounts and aligning with a corresponding sliding channel;
    a slide being mounted slidably in the corresponding sliding channel and abutting and being pressed outwards by the spring; and
    a leg being formed on and protruding towards the base from the slide, corresponding to the cavity of the container mount and selectively abutting the top of the container mount; and
a cover being detachably mounted around the container assembly and the container mount, allowing the rotating shaft to be driven by the driver and having
  an inner wall;
  multiple pushers being formed on the inner wall of the cover, corresponding to the sliding channels and selectively pressing the slides of the movable stops inwardly against the springs; and at least one positioning tab.

2. The safety food grinder as claimed in claim 1, wherein the driver further has
 a connecting recess being formed concentrically in the top of the driver and having a bottom; and
 an engaging head being keyed, being formed concentrically in and protruding from the bottom of the connecting recess; and
the rotating shaft further has a shaft coupling being attached securely coaxially on the lower end of the rotating shaft, being detachably attached to the driver and having
 a lower end; and
 an engaging recess being formed in the lower end of the shaft coupling, corresponding to the engaging head and being detachably mounted around the engaging head.

3. The safety food grinder as claimed in claim 1, wherein the bottom extension further has a shaft sleeve being mounted securely coaxially through the bottom wall of the container frame and the bottom extension and being mounted around the rotating shaft.

4. The safety food grinder as claimed in claim 1, wherein the container assembly further has multiple clamps being
 mounted below the bottom wall of the container frame and being respectively mounted between the spring mounts and the sliding channels; and
the slides of the movable stops being mounted respectively through and being clamped by the clamps.

5. The safety food grinder as claimed in claim 2, wherein the container assembly further has multiple clamps being
 mounted below the bottom wall of the container frame and being respectively mounted between the spring mounts and the sliding channels; and
the slides of the movable stops being mounted respectively through and being clamped by the clamps.

6. The safety food grinder as claimed in claim 3, wherein the container assembly further has multiple clamps being
 mounted below the bottom wall of the container frame and being respectively mounted between the spring mounts and the sliding channels; and
the slides of the movable stops being mounted respectively through and being clamped by the clamps.

7. The safety food grinder as claimed in claim 4, wherein the outer surface of the container mount is keyed.

8. The safety food grinder as claimed in claim 5, wherein the outer surface of the container mount is keyed.

9. The safety food grinder as claimed in claim 6, wherein the outer surface of the container mount is keyed.

10. The safety food grinder as claimed in claim 7, wherein
 the connecting cylinder further has at least one positioning boss being formed on and protruding from the lower edge of the sidewall of the connecting cylinder; and
the at least one positioning tab selectively abutting a corresponding positioning boss, and each one of the at least one positioning tab has a positioning slot being formed in the positioning tab and selectively engaging the corresponding positioning boss.

11. The safety food grinder as claimed in claim 8, wherein
 the connecting cylinder further has at least one positioning boss being formed on and protruding from the lower edge of the sidewall of the connecting cylinder; and
the at least one positioning tab selectively abutting a corresponding positioning boss, and each one of the at least one positioning tab has a positioning slot being formed in the positioning tab and selectively engaging the corresponding positioning boss.

12. The safety food grinder as claimed in claim 9, wherein
 the connecting cylinder further has at least one positioning boss being formed on and protruding from the lower edge of the sidewall of the connecting cylinder; and
the at least one positioning tab selectively abutting a corresponding positioning boss, and each one of the at least one positioning tab has a positioning slot being formed in the positioning tab and selectively engaging the corresponding positioning boss.

\* \* \* \* \*